Figure 1:
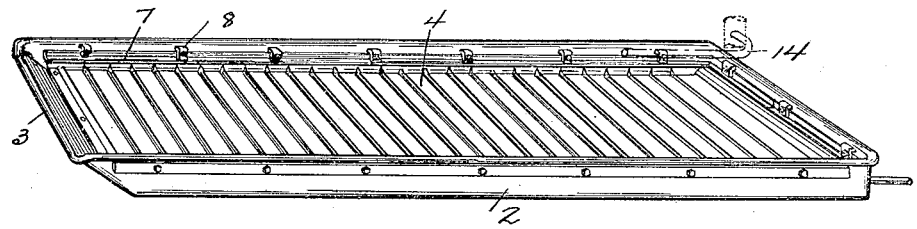

C. BUTTERS
FILTER.
APPLICATION FILED JUNE 18, 1913.

1,136,863.

Patented Apr. 20, 1915.

WITNESSES:
H. J. Prost.
P. S. Pidwell

INVENTOR.
CHARLES BUTTERS
BY Kenyon & Kenyon
his ATTORNEYS.

UNITED STATES PATENT OFFICE.

CHARLES BUTTERS, OF OAKLAND, CALIFORNIA.

FILTER.

1,136,863. Specification of Letters Patent. Patented Apr. 20, 1915.

Application filed June 18, 1913. Serial No. 774,295.

*To all whom it may concern:*

Be it known that I, CHARLES BUTTERS, a citizen of the United States, and a resident of Oakland, county of Alameda, State of California, have invented certain new and useful Improvements in Filters, of which the following is a specification.

The invention relates to filters for separating solids and semi-solids from their carrying liquid.

The object of the invention is to provide a filter which operates in a horizontal plane.

A further object of the invention is to provide a horizontal filter which will not sag or belly due to the weight of the material being filtered thereon.

A further object of the invention is to provide a horizontal filter having the capacity of readily discharging the cake of unfiltered material when tilted to an angle with the horizontal.

The invention possesses other advantageous features which, with the foregoing, will be set forth at length in the following description where I shall outline in full that form of the invention which I have selected for illustration in the drawings accompanying and forming part of the present specification.

The novelty of the invention will be included in the claims succeeding said description. From this it will be apparent that I do not limit myself to the showing made by said drawings and description as I may adopt many variations within the scope of my invention as set forth in said claims.

Figure 4:
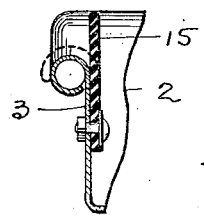
Figure 2:
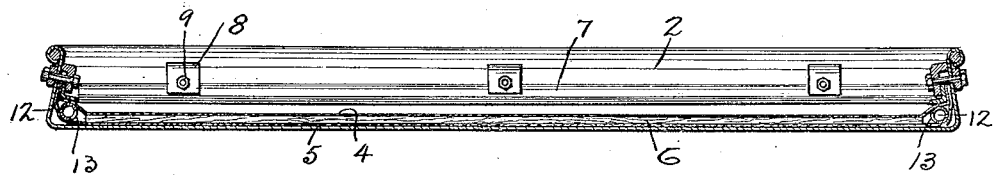
Figure 3:
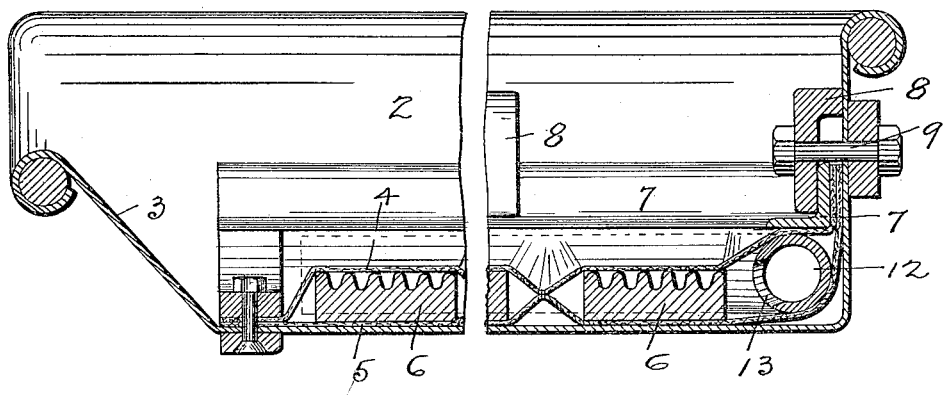

Referring to said drawings: Figure 1 is a perspective view of the filter. Fig. 2 is a cross-section of the filter. Fig. 3 is a longitudinal section of the filter on a larger scale, part thereof being broken away to reduce the size of the figure; and Fig. 4 is a fragment showing a modified form of discharge lip.

The present filter is particularly adapted for filtering the liquid from the solid and semi-solid material in the ore slimes of the cyanid process, but it is evident that it may be used in any instance for separating liquid from solids or semi-solids. The filter is designed to lie in a horizontal or substantially horizontal position, during the filtering operation and to be tilted to the vertical plane or to a position intermediate the horizontal and vertical planes for the purpose of discharging the solid material therefrom. In order to obtain the necessary filtering capacity, a plurality of filters are preferably superposed and arranged in as close relation to each other as practical and all of the filters are simultaneously charged and simultaneously discharged.

The filter consists of a pan 2 preferably formed of sheet metal, all the joints and seams of which are welded to prevent leakage and the surfaces of which are as free as possible from obstructions especially underneath. The pan is preferably formed rectangular in shape and ten feet by two and a half and one of the short sides thereof is provided with a low discharge lip 3 over which the cake is discharged when the filter is tilted.

Arranged in the bottom of the pan is a filter leaf composed of two pieces 4—5 of canvas or other suitable fabric, between which are arranged at suitable intervals, the cross fillers 6. These fillers are grooved or corrugated on their upper surfaces to provide channels for the filtered liquid and to allow the vacuum or reduction of pressure within the leaf to have access to all parts of the upper fabric 4. These cross fillers extend transversely of the pan and act also to support the filter cake and bath thereby preventing the bottom of the pan from sagging or bellying. On account of the close superposed relation of the filters, the bellying of one pan, or any obstructions on the bottom of one pan, would interfere with the discharge of the cake in the pan below. The cross fillers 6 are held in position by sewing or stitching the upper and lower fabrics 4—5 together intermediate the successive fillers and the stitching also prevents ballooning of the fabric.

The two fabrics preferably extend upward adjacent the sides and one end of the pan, to which they are clamped by the angle irons 7. These angles 7 are in turn pressed toward the side of the pan by means of the clamps 8 and bolts 9. The angle irons 7 are continuous around the rear corners so that the fabric is held securely on two sides and the rear end. I find this construction preferable to passing the bolt directly through the angle, since this construction obviates the necessity of punching or cutting holes in the fabrics, a feature which is objectionable when it is desirable to remove the fabrics and then replace them.

Arranged between the two layers of fabric and located below the angles 7 and extending along the two long sides of the pan, are the pipes 12 provided with a plurality of apertures 13. The pipes 12 project from the pan, so that one or both of them may be readily connected to suitable mechanism for producing the desired vacuous condition between the fabrics, or to a water or air supply. In order to prevent the discharge liquid from passing through the lower fabric 5 and onto the bottom of the pan, and in order also to limit the filtering medium and operation, I find it desirable to coat the lower fabric 5 with a waterproof or impervious material.

The discharge lip 3 extends upward above the level of the upper fabric 4 so that the filter leaf may be submerged and the vacuum sealed in a shallow bath. The material to be filtered is fed onto the filter leaf by any suitable means. I prefer the conductor 14 extending inwardly a foot or more along one side of the pan and delivering under the surface of the bath when the pan is full. This occasions an energetic circulation of the unsettled solid matter over the entire leaf, causing the cake to be uniformly deposited. The feed of material may be continuous and may be greater than the rate at which the filtered liquid is being withdrawn, in which case the excess will overflow the discharge lip and may be caught and carried by gravity to a pulp supply tank by any suitable means such as that shown in my application, Serial No. 774,294. If it is desired to increase the cubical contents of the pan this may be done, as shown in Fig. 4, by raising the normal level of the discharge lip. This may be accomplished by placing a flexible dam 15 of rubber or similar material at the discharge lip, which extends upward to the level of the top of the pan. This dam or lip is of sufficient stiffness to resist the force or weight of the liquid when the pan is horizontal and of sufficient flexibility that it readily bends to produce the required discharge aperture for the cake when the pan is tilted.

In the practical employment of my improved unit it may be advisable that they be arranged as close as possible, as, say, three inches for each unit, so that a large filtering capacity may be obtained.

This is fully described in my application above mentioned. Broadly that arrangement consists of a main frame to receive the units and adapted to be tilted to discharge the solid matter which may be collected therein.

I claim:—

1. A filter comprising a shallow pan, a filtering medium arranged in said pan, a plurality of transverse supports arranged below said medium, and a perforated pipe arranged below said medium.

2. A filter comprising a shallow pan having one end thereof of less height than the other three sides, and a filtering medium in said pan.

3. A filter comprising an elongated shallow pan adapted to be tilted provided on one end with a discharge lip of less height than the other three sides, and a filtering medium arranged in said pan below the level of said lip.

4. A filter comprising a shallow pan having a discharge lip of less height than the other three sides, a filtering medium arranged in said pan and attached thereto, and means for producing a variation in pressure below said medium.

5. A filter comprising a pan having a discharge lip, a flexible dam arranged to extend above said discharge lip, and a filtering medium arranged in said pan.

6. A filter comprising a pan, a filter leaf arranged in said pan, said leaf comprising two fabrics sewed together at intervals, cross supports arranged between said fabrics intermediate the lines of sewing, and means for producing variations of pressure between said fabrics.

7. A filter comprising a pan adapted to be tilted from the horizontal position, a filtering medium in said pan, means for drawing the liquid being filtered through said filtering medium, a discharge lip on said pan, and a dam arranged to extend above said lip and adapted to be moved to allow the discharge of the solid material when the pan is tilted.

8. In a filter, a pan, two fabrics arranged in the bottom of said pan, said fabrics being joined together at intervals by lines of stitching extending transversely of the pan, grooved supports arranged between said fabrics and intermediate the successive lines of stitching, said supports extending from side to side of the pan, a coating of waterproof material on said lower fabric, a perforated pipe arranged between said fabrics and means for producing variations of pressure between said fabrics.

9. A filtering element for a horizontal filter comprising a filtering medium, means for preventing ballooning of said medium in either direction, and a pan or container for said medium having an overflow lip lower than the other three sides, and so low that said medium can only be thinly covered by a shallow bath or film of the material to be filtered.

In testimony whereof, I have signed my name to this specification, in the presence of two subscribing witnesses.

CHARLES BUTTERS.

Witnesses:
NEWTON A. BURGESS,
EDWIN SEGER.

Copies of this patent may be obtained for five cents each, by addressing the "Commissioner of Patents, Washington, D. C."